US007849196B2

(12) United States Patent
Gkantsidis et al.

(10) Patent No.: US 7,849,196 B2
(45) Date of Patent: Dec. 7, 2010

(54) CONNECTION MANAGEMENT IN PEER-TO-PEER CONTENT DISTRIBUTION CLOUDS

(75) Inventors: Christos Gkantsidis, Cambridge (GB); John Miller, Cambridge (GB); Manuel Costa, Cambridge (GB); Pablo Rodriguez Rodriguez, Barcelona (ES); Stuart Ranson, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 12/097,946

(22) PCT Filed: Dec. 4, 2006

(86) PCT No.: PCT/US2006/046227

§ 371 (c)(1),
(2), (4) Date: Jun. 18, 2008

(87) PCT Pub. No.: WO2007/075266

PCT Pub. Date: Jul. 5, 2007

(65) Prior Publication Data

US 2008/0294779 A1 Nov. 27, 2008

(30) Foreign Application Priority Data

Dec. 22, 2005 (EP) ................... 05270099

(51) Int. Cl.
*G06F 15/173* (2006.01)

(52) U.S. Cl. ............... 709/227; 709/224; 709/226; 709/228; 709/229; 709/249; 340/2.1; 340/825; 707/622

(58) Field of Classification Search ................. 709/201, 709/204, 223, 224, 238, 241, 206, 227; 370/400; 713/168; 707/999.1
See application file for complete search history.

(56) References Cited

U.S. PATENT DOCUMENTS

| 6,252,884 B1 | 6/2001 | Hunter | |
| 6,331,983 B1 * | 12/2001 | Haggerty et al. | ............ 370/400 |
| 6,600,817 B1 * | 7/2003 | Shaffer et al. | ............... 379/199 |

(Continued)

OTHER PUBLICATIONS

Plissonneau et al. Analysis of Peer-to-Peer Traffic on ADSL. Tech. Springer-Verlag Berlin Heidelberg, 2005. Print.*

(Continued)

*Primary Examiner*—Wing F Chan
*Assistant Examiner*—Michael Martinez
(74) *Attorney, Agent, or Firm*—Lee & Hayes, PLLC

(57) ABSTRACT

A topology management process is implemented which involves removing or "tearing down" connections between nodes in certain situations in order to try to replace those connections with more optimal ones. Idle connections are torn down unless those are in a "notify" state; a notify state being one in which a request for content has been made to a neighbour but that neighbour has no available content as yet. Idle connections in a notify state are torn down only if they remain idle for a longer time than that required before an idle connection is torn down. To avoid problems caused by clusters of node forming and of loners being unable to join the cloud, network churn algorithms are taught. These involve requiring nodes to drop connections when specified conditions are met. Relative content distribution between connections is monitored and this information used to influence selection of those connections to drop.

13 Claims, 6 Drawing Sheets

U.S. PATENT DOCUMENTS

| | | | |
|---|---|---|---|
| 7,404,006 B1* | 7/2008 | Slaughter et al. | 709/238 |
| 7,496,648 B2* | 2/2009 | Manion et al. | 709/223 |
| 2002/0156897 A1* | 10/2002 | Chintalapati et al. | 709/227 |
| 2003/0055892 A1* | 3/2003 | Huitema et al. | 709/204 |
| 2004/0044790 A1* | 3/2004 | Loach et al. | 709/241 |
| 2004/0064693 A1* | 4/2004 | Pabla et al. | 713/168 |
| 2004/0093407 A1* | 5/2004 | Sample | 709/224 |
| 2004/0215693 A1* | 10/2004 | Thompson | 709/201 |
| 2005/0038801 A1* | 2/2005 | Colrain et al. | 707/100 |
| 2007/0067438 A1* | 3/2007 | Goranson et al. | 709/224 |
| 2008/0059631 A1* | 3/2008 | Bergstrom et al. | 709/224 |
| 2008/0301246 A1* | 12/2008 | Gkantsidis et al. | 709/206 |

OTHER PUBLICATIONS

A. Spognardi, A. Lucarelli, and R. Di Pietro, "A methodology for P2P file-sharing traffic detection," in Proceedings of the 2nd International Workshop on Hot Topics in Peer-to-Peer Systems (HOT-P2P '05), pp. 52-61, San Diego, Calif, USA, Jul. 2005.*

T. Karagiannis, A. Broido, M. Faloutsos, and K. Claffy, "Transport layer identification of P2P traffic," ACM SIGCOMM/USENIX Internet Measurement Conference (IMC), Oct. 2004.*

Klemm et al. Characterizing the query behavior in peer-to-peer file sharing systems. Tech. ACM SIGCOMM, 2004. Print.*

Houeto, Fabien et al., "Reliability and Cost Evaluation of Third-Generation Wireless Access Network Topologies: A Case Study", 2002 IEEE, vol. 51, No. 2, Jun. 2002, pp. 229-239.

Zhu, Danyu et al., "Sharing Presence Information and Message Notification in an Ad Hoc Network", 2003 IEEE, 8 pages.

Merugu, et al., "p-sim: A Simulator for Peer-to-Peer Networks*", 11th IEEE/ACM International Symposium on Modeling, Analysis and Simulation of Computer Telecommunications Systems, 2003. MASCOTS 2003. 6 pages.

\* cited by examiner

US 7,849,196 B2

CONNECTION MANAGEMENT IN PEER-TO-PEER CONTENT DISTRIBUTION CLOUDS

RELATED APPLICATIONS

This application is a National Stage of International Application No. PCT/US2006/0046227, filed 4 Dec., 2006, which claims priority from European Patent Application No. 05270099.4, filed on Dec. 22, 2005. Both applications are incorporated herein by reference.

TECHNICAL FIELD

This description relates generally to peer-to-peer content distribution and more specifically to connection management in peer-to-peer content distribution clouds.

BACKGROUND

Topology management in peer-to-peer file sharing clouds is a significant problem that needs to be addressed in order to increase the speed and ease with which all or most members of the cloud can receive content being shared.

In the past, large scale content distribution has been carried out using dedicated server farms providing infrastructure-based solutions. In this type of method, each client requiring content forms a dedicated high bandwidth connection to a server at a server farm and downloads content as required. This type of solution is costly for the content provider who must provide and maintain the server farm. FIG. 1 illustrates this type of solution having servers 1 and clients 2, each client having direct connections to one server. Not only is this type of solution costly for content providers but it is not robust in that failure at a server prevents content from being provided to many clients. In addition, the solution is not easily scalable because each server supports a limited number of clients.

More recently a new paradigm for content distribution has emerged based on a distributed architecture using a co-operative network in which nodes share their resources (storage, CPU, bandwidth).

Cooperative content distribution solutions are inherently self-scalable, in that the bandwidth capacity of the system increases as more nodes arrive: each new node requests service from, and, at the same time, provides service to other nodes. Because each new node contributes resources, the capacity of the system grows as the demand increases, resulting in limitless system scalability. With cooperation, the source of the file, i.e. the server, does not need to increase its resources to accommodate the larger user population; this, also, provides resilience to "flash crowds"—a huge and sudden surge of traffic that usually leads to the collapse of the affected server. Therefore, end-system cooperative solutions can be used to efficiently and quickly deliver software updates, critical patches, videos, and other large files to a very large number of users while keeping the cost at the original server low.

BitTorrent®, available from BitTorrent, Inc. Corp. California 612 Howard Street, Suite 400 San Francisco Calif. 94105, is an existing peer-to-peer file sharing protocol written by Bram Cohen and currently publicly available under an open source license. Under the BitTorrent® algorithm a file for distribution is split into blocks or fragments.

These blocks are distributed to nodes in a cloud in a random order and can be reassembled on a requesting node. Each node downloads missing blocks from other nodes to which it is connected and also provides an upload connection to the blocks it already has.

Despite their enormous potential and popularity, existing end-system cooperative schemes such as BitTorrent®, can suffer from inefficiencies in some situations which decrease their overall performance. Such inefficiencies are more pronounced in large and heterogeneous populations, during flash crowds, in environments with high churn, or where co-operative incentive mechanisms are in place. The present invention is concerned with ways in which network topology management and other methods can be used to reduce or alleviate some or all of these problems.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A topology management process is implemented which involves removing or "tearing down" connections between nodes in certain situations in order to try to replace those connections with more optimal ones. Idle connections are torn down unless those are in a "notify" state; a notify state being one in which a request for content has been made to a neighbor but that neighbor has no useful content as yet. That is, the neighbor's content is a subset of the requestor's content. Idle connections in a notify state are torn down only if they remain idle for a longer time than that required before an idle connection is torn down. To avoid problems caused by clusters of nodes forming and of nodes being unable to join the cloud, network churn algorithms are taught. These involve requiring nodes to drop connections when specified conditions are met. Relative content distribution between connections is monitored and this information used to influence selection of those connections to drop.

We describe a method of managing connections at a node in a peer-to-peer content distribution cloud. The method involves:

monitoring traffic on connections at the node for a specified first time period;

allocating as being in a notify state any idle connections at the node over which content has been requested from a neighbor but is not present at that neighbor; and tearing down any connections at the node which have been idle for at least that specified first time period and which are not in a notify state. Connections in a notify state can also be torn down in particular situations as explained in more detail later in the document.

This method provides the advantage that by tearing down connections that are not providing content either by upload or download those connections can then be replaced by other connections which may be more useful in terms of content distribution. In this way we are able to reduce the amount of time taken for all members of the cloud to receive a complete copy of the content being distributed. These algorithms that we have developed for "cleaning up" connections also have the advantage that they do not impose too much complexity in terms of computation required at peer nodes and as a result we have found improved results compared with alternative methods which are more complex. The use of the "notify" state developed by us, is particularly advantageous because it allows idle connections that may potentially become useful in the near future to be maintained for longer than other idle connections. For example, neighbor nodes which have not yet received any content may soon do so and be able to share this with the node concerned.

Preferably the method further comprises tearing down any connections at the node which have been in a notify state for at least a second specified time period which is longer than the first time period. This allows connections that are in a notify state to be dropped eventually. In this way, connections to neighbor nodes that may yield useful content in future are maintained but not indefinitely.

Preferably said second time period is about twice as long as the first time period. We have found empirically and through simulation studies that maintaining connections that are in a notify state for about twice as long as other idle connections provides good results. We also found good results where said first time period is between about 3 and 7 minutes.

Preferably the method further comprises specifying a minimum number of connections required by the node in order to be part of the peer-to-peer content distribution cloud, and allowing the number of connections at the node to fall below the minimum in specified situations. We have found that by using "elastic" minima in this way we can speed up distribution of content through the network. For example, in some situations we allow a node that has less than the required minimum number of connections to remain in the cloud for a limited time.

Similarly, the method can comprise specifying a maximum number of connections required by the node in order to be part of the peer-to-peer content distribution cloud, and allowing the number of connections at the node to exceed the maximum in specified situations. This type of "elastic" maximum also enables us to speed up distribution of content through the cloud.

Preferably, said step of monitoring traffic on connections at the node further comprises obtaining information about relative content distribution over those connections. For example, this can be the rate of receipt of blocks of content over connections or the rate of upload of blocks of content. Information about bandwidth of the connections, historical information and/or forecast information can also be used.

Preferably the method further comprises, once every specified interval, selecting one of the connections at the node and tearing down that connection. This enables us to ensure a degree of network "churn" in that connections must be dropped at some times and this provokes new connections to be formed. We have found that this type of method allows us to reduce the formation of clusters and to assist new nodes in joining the cloud.

Preferably the connection is selected in a substantially random manner from at least a subset of the connections at the node. For example, a pseudo random algorithm can be used.

In one example said subset of the connections at the node excludes the connection where the monitored relative content distribution over that connection is the lowest. This helps to prevent loners being created.

In another example the subset of the connections at the node excludes the connection where the monitored relative content distribution over that connection is the highest. This helps to prevent loss of good connections over which high amounts of content are being distributed. This can be extended by also excluding the second and/or third highest connections in terms of relative content distribution.

We also describe a node in a peer-to-peer content distribution cloud, the node has:
  a plurality of connections to other nodes in the cloud;
  a monitor arranged to monitor traffic on connections at the node for a specified first time period;
  an allocator arranged to allocate as being in a notify state any idle connections at the node over which content has been requested from a neighbor but is not present at that neighbor;
  a processor arranged to tear down connections at the node which have been idle for at least that specified first time period and which are not in a notify state.

Allocation of a connection to a 'notify' state can also be vetoed by either side of a connection, for example, if either side of the connection has too large a proportion of connections already in a notify state. By "too large" we mean, for example, half or more of a specified maximum of connections.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "cloud" is used herein to refer to a plurality of nodes in a communications network which have access to a peer-to-peer file sharing protocol and are using that protocol to try to obtain a copy of a particular piece of content such as a file that is being distributed. A cloud is also referred to as a graph in some literature. The nodes in the cloud each have one or more current connections using that protocol to others of the nodes. Thus nodes can join or leave the cloud as they drop or form connections to nodes already in the cloud. The connections need not always be actively used for content distribution although the connections need to be suitable for doing so using the particular protocol, which may or may not use network encoding. The connections can either be one-way or two-way connections. In the particular examples described herein all the connections are one-way such that the clouds are asymmetrical although the invention is applicable to and encompasses symmetrical clouds in which the connections are two-way with single connections supporting traffic in both upload and download directions. Also, a given node can be a member of more than one cloud at a time. For example, a first cloud where nodes are trying to obtain a copy of a video being shared and a second cloud where the nodes are trying to obtain a copy of a portfolio of digital still images. Clouds can be independent of one another or may overlap partially or fully.

Figure 2:
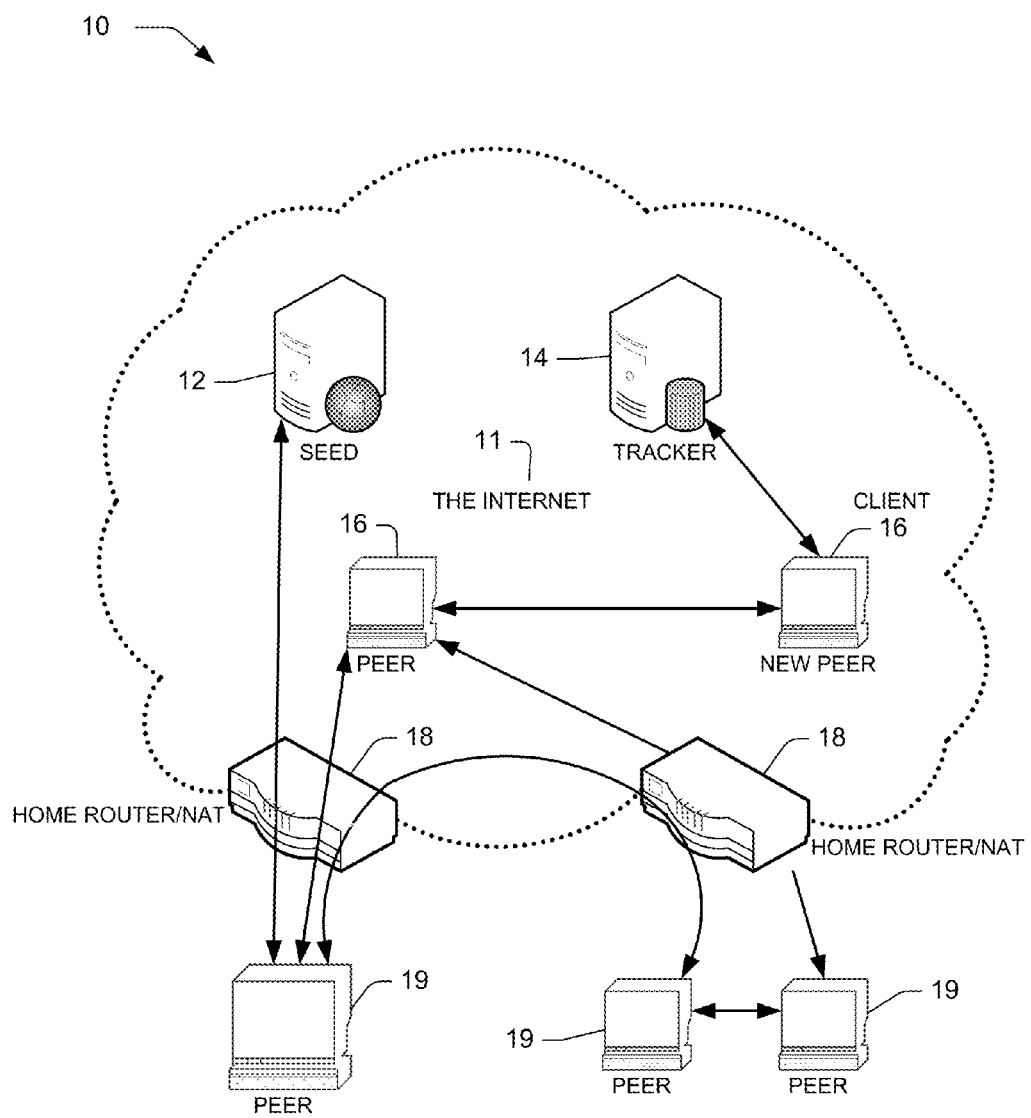
FIG. 2 is a schematic diagram of a peer-to-peer file sharing cloud.

FIG. 2 is a schematic diagram of a peer-to-peer file distribution cloud 10 comprising a plurality of nodes connected via the internet 11 or any other suitable communications network. The cloud itself may comprise many more nodes although for clarity less than ten are illustrated. Also, other nodes may be present connected between or directly to cloud members, although not being peer-to-peer file sharing participants and so not members of the cloud, these are not illustrated.

One or more seed nodes 12 are provided in the cloud 10. A seed node is one from which content, also referred to as files, originates. For example, suppose a company has a product demonstration video which it wishes to share publicly to the cloud members. This file can be placed on a seed node. The seed node is typically "always on" such that content files are available to upload from it for significant periods of time (barring maintenance periods etc.). Generally a seed node is active in uploading content and not downloading content. Only a limited and relatively small number of nodes in the cloud can download content from the seed node simultaneously. The seed node may or may not use the peer-to-peer file sharing protocol to upload the content to other members of the cloud. However, those other members go on to share the content or parts of the content with cloud members using the peer-to-peer file sharing protocol. Thus other cloud members can effectively act as seed nodes for periods of time during which they allow content to be uploaded from themselves but do not actively download content during that time. In some cases, once the seed node 12 has transmitted the content into the cloud, it is possible for the seed node 12 to go offline whilst the cloud 10 still functions.

One or more tracker nodes 14 are provided in the cloud 10. A tracker node 14 has information about cloud members such as whether a peer is participating in the cloud and has any information to share. This tracker node helps cloud members to find other cloud members which have required content.

Figure 1:
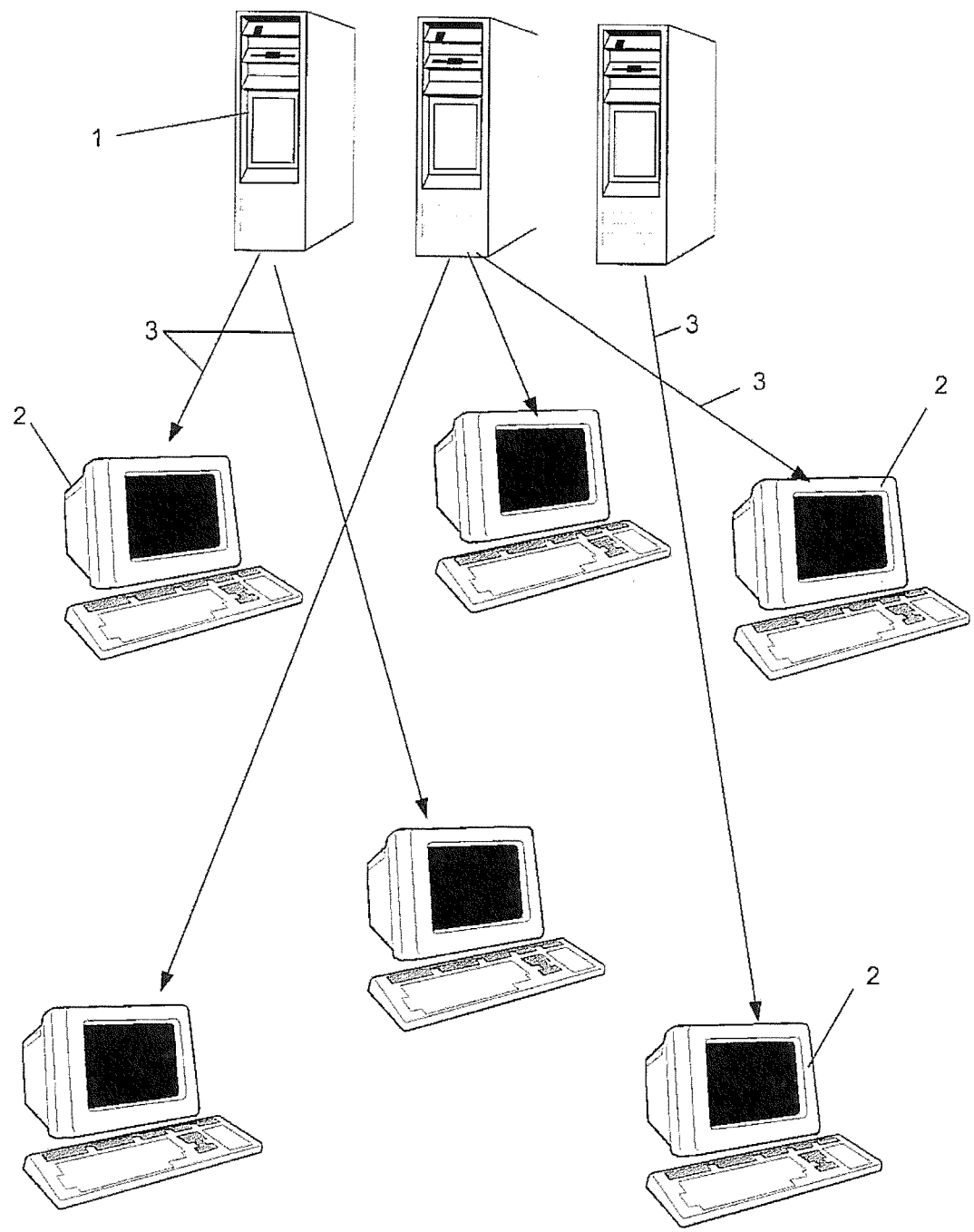
FIG. 1 is a schematic diagram of a prior art content distribution system using a server farm.

A plurality of peer nodes 16, 19, also referred to as clients, are also present in the cloud. A peer node is one which requires the content being shared in the cloud and which may or may not also share parts of that content which it has obtained. A peer node may act as a temporary seed as mentioned above. In the example illustrated in FIG. 1, peer nodes 16 are located in a public network such as the internet whilst peer nodes 19 are located in private enterprise networks or home networks behind a firewall and/or network address translator (NAT) 18.

The term "leech" is used to refer to a peer which downloads but does not upload content; a leech is a parasite taking from the system and giving little or nothing in return. For example, the leech may be a node which downloads content frequently but which provides little or no upload capability to other peer nodes.

The term "loner" is used to refer to an individual node seeking to join a peer-to-peer content distribution cloud but which has not yet formed a minimum number of connections to peers in the cloud.

As mentioned above, existing peer-to-peer file sharing protocols often suffer problems in particular situations which decrease their overall performance. For example, in cases where the cloud comprises large or heterogeneous populations, during flash crowds, in environments with high churn or where co-operative incentive mechanisms are in place. The present invention is concerned with ways in which network topology management and other methods can be used to reduce or alleviate some or all of these problems. In addition, the present invention lies at least partly in recognizing problems that can occur and identifying situations in which these problems are most likely to arise. This has been achieved through both empirical testing in live networks and using computer simulations. A number of these problems that we have identified through empirical testing and simulations are described below reference to FIGS. 3 and 4.

We specified an overall aim or goal for our peer-to-peer file sharing techniques as enabling all (or a majority of) cloud members to obtain a complete copy of the file being distributed in the shortest possible time. In some cases we also seek to reduce the number of times the seed nodes or originating servers need to provide uploads of the content to be shared.

With these aims in mind we created a topology management process which involves removing or "tearing down" connections between nodes in certain situations in order to try to replace those connections with more optimal ones. In order to do this we created a number of conditions or rules to be implemented at peer nodes. Many of these rules are preferably, but not essentially, evaluated periodically (such as over a minute) rather than instantly. This helps to prevent unnecessary thrash in the network. Examples of some of these conditions or rules are now given:

Each peer node is provided with a pre-specified maximum number of connections it can form to its neighbors and a pre-specified minimum number of those connections. A neighbor node is one to which a direct connection is formed in a single logical "hop". That is nodes that are indirectly connected are not considered as neighbors for the purposes of this document. For example, the minimum number of connections a peer node must have in order to participate in the cloud can be about 4. The maximum number of connections a peer node can have in order to remain in the cloud can typically be on the order of 10s.

If any node has been idle for more than a specified threshold time period, or waiting for a notification for more than a specified threshold time period, then disconnect.

If as a result of a disconnect or otherwise the number of connections is below the minimum then ask the tracker for peers to connect to.

If any connection is downloading at a rate slower than a specified download rate and there are active downloads at the same node which are as fast or faster, then disconnect.

If any connection is uploading at a rate slower than a specified threshold then disconnect.

If there are download connections idle, and more downloads are needed, request a download on idle connections.

If there are too few active upload or download connections, ask the tracker for more peers to connect to, then connect to them with both upload and download connection requests.

Each node initiates separate connections for uploading and downloading content (in the case that the cloud is asymmetrical).

A node will not initiate or accept download connections if it already has all content local.

A node may increase its upload connection limit if it has all content local.

In addition to idle, downloading and uploading states, we specify a new state in which connections may be referred to as a "notify" state. A notify state occurs if a peer requests a download over a connection but the remote peer has no useful content to offer. It can also occur if a peer requests information from a tracker but the tracker has no new peer information to supply.

If a node at a download side of a connection has more than a specified number of its download connections in a notify state then disconnect one or more of those connections in a notify state.

If a node at an upload side of a connection has more than a specified number of its upload connections in a notify state then disconnect one of those connections.

Allow a connection to wait in "notify" state for longer than it is allowed to remain in an "idle" state.

It is not essential to use all these rules or conditions. That is, one or more of these rules or conditions may be implemented in methods at the peer nodes.

Figure 3:
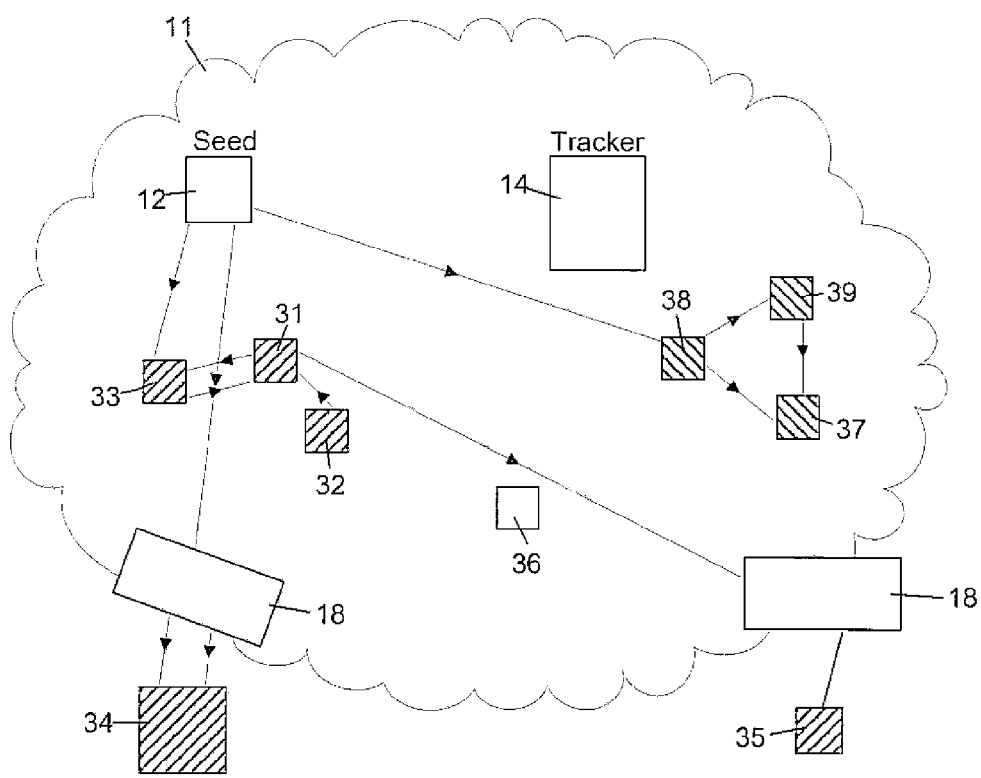
FIG. 3 is a schematic diagram of another example of a peer-to-peer file sharing cloud.

Using these types of connection dropping and initiating conditions or rules we found that in some situations clusters of nodes form in the cloud with little or no interaction between those clusters. This was found to be problematic in some situations because the time taken for each member of the cloud to obtain a complete copy of the file being distributed was high. FIG. 3 illustrates this situation and shows two clusters of nodes, a first cluster comprising nodes 31 to 35 and a second cluster comprising nodes 37 to 39. Having said that, we found that clusters are disadvantageous only in some situations whereas islands (disconnected clusters) almost always lead to degraded performance.

FIG. 3 is a schematic diagram of a peer-to-peer file sharing cloud similar to that of FIG. 2. During execution of the file sharing process, for example to share video A at seed 12 to each member of the cloud 11, clusters of nodes tend to form. We found that those clusters were likely to form where the peer nodes used rules or criteria arranged to tear-down 'non-optional' connections and/or where the network itself is heterogeneous. For example this heterogeneity can be a result of presence of connections or different bandwidths and/or the use of firewalls and network address translators (NATs). Such clusters of nodes are sometimes disadvantageous when using peer-to-peer file distribution because blocks of content can become held in a cluster and become unavailable or at least very difficult to obtain by cloud members outside that cluster. Having said that, in some cases clustering is desirable, but the presence of islands, which are disconnected clusters, is always problematic. Thus islands and/or clusters can increase the amount of time taken for all cloud members to obtain a complete copy of the content being distributed. In addition, we found that the connections between cluster members or island members was often typically very good such that rules or conditions arranged to tear down 'non-optional' connections did not apply to those connections. As a result the clusters and islands tended to persist in the cloud for a considerable time.

In some situations we also observed another problem in that some individual nodes become isolated in the cloud and unable to make the required minimum number of connections. This tended to occur in situations where clusters of nodes also existed in the cloud. We refer to these isolated nodes as 'loners' and node 36 in FIG. 3 is an example. The presence of loners is a particular problem because it greatly increased the amount of time needed for all members of the cloud to receive the content being distributed.

In order to address the problem of clusters and/or islands we developed rules or criteria to be implemented at peer nodes in the cloud. These rules or criteria aim to increase churn in the cloud; that is, to increase or ensure at least some, turnover in the connections between nodes in the cloud. In this way, we aim to spread the benefit of access to blocks already downloaded from the seed node. An example of this type of rule or condition to be implemented at a peer is count the number of blocks sent or received at the peer and once this reaches a specified number then drop one of the peer's connections.

For example, the specified number of blocks sent or received is set to a number similar to (or of the same order as) the number of connections at the peer. Alternatively, the peer is arranged to drop one of its connections once a specified time interval has passed.

The rule or condition can be modified by specifying criteria for selecting which connection to drop. For example, the selection can be made at random, by selecting based on the length of time the connection has existed, by selecting based on the rate of block transfer on the connections, by selecting based on the bandwidth of the connections and any other suitable criteria. These can be thought of as criteria based on physical characteristics of the connection such as bandwidth, whether the connection is two-way or one-way, whether the connection is between endpoints at geographically distant network locations and other criteria related to the traffic on the connection both historically, currently and possibly also as forecast.

In the case that maximum and minimum numbers of connections are specified at the individual peer nodes then the situation can arise that a peer node is required to drop an existing connection in order to implement a "network churn" algorithm such as those discussed above. This could require the peer node to drop a connection and bring its total number of connections to below the minimum. We have found empirically that this situation is acceptable, and workable especially in the case that the peer-to-peer file sharing algorithm being used comprises a network coding aspect. This is explained in more detail below.

By using rules or conditions to ensure network churn in this way we have been able to reduce the incidence of node clusters forming in the cloud. In addition, the presence of loners is reduced because network churn ensures that new connections are continually sought and this provides opportunities for loners to connect to other cloud members.

In addition, through use of simulations and by empirical testing in live networks we have found that generally speaking, the fewer rules or conditions implemented at peer nodes, and the simpler these rules and conditions are, the better the file-sharing performance.

Figure 4:
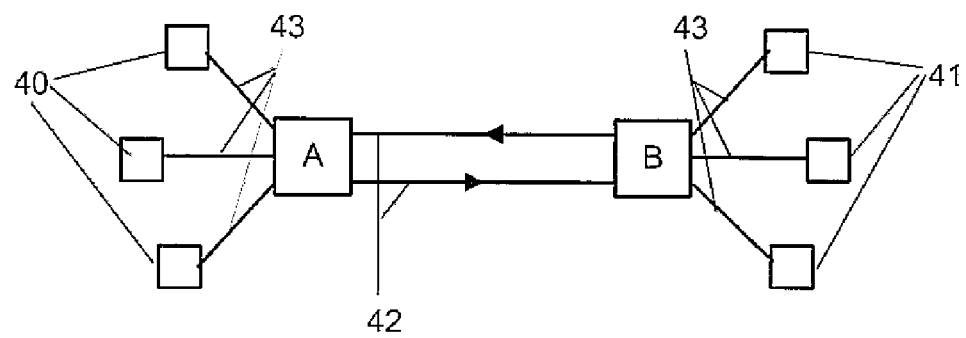
FIG. 4 is a schematic diagram of two nodes connected to one another by high bandwidth connections, each of those nodes also being connected to other nodes by low bandwidth connections.

Once peer nodes have been set up to implement connection 'clean up' and network 'churn' algorithms as discussed above, we found another type of problem during our empirical and simulation studies. This involves high bandwidth, high performance connections which are acting to allow fast and high levels of content distribution being lost or torn down inadvertently. FIG. 4 illustrates this situation. It shows two nodes A and B connected to one another by connections 42 which are fast, high bandwidth connections. Each of nodes A and B is also connected by slow, low bandwidth connections 43 to nodes 40 or 41. In this situation, suppose that A and B both have relatively high amounts of content that they are in the process of sharing with one another. If A then drops its connection to node B then A is left holding a relatively large amount of content which it is unable to share quickly with its remaining neighbors 40 because connections 43 are slow, low bandwidth connections. As a result rare content that A may hold is prevented from being distributed quickly and consequently the overall time for each cloud member to receive a complete copy of the file being distributed is increased.

In order to address this issue we modified the network 'churn' algorithm to ensure that the highest bandwidth, fast connections are maintained. For example, the connections at peer nodes are ranked or prioritized on the basis of their bandwidth or the rate of traffic flow. The network 'churn' algorithm selects a connection to drop on the basis of this ranking. However, the slowest connection is not dropped because we have found that doing so tends to randomly pick one of a node's connections to drop provided this is not one of the top 2 or 3 fastest, or the slowest connection.

Another problem that arises as a result of network heterogeneity relates to public and private networks and whether nodes are reachable. For example FIG. 2 shows a public network 11 (the Internet in this case) and two have routers or network address translators (NATs) 18. Nodes 19 connected behind the NATs 18 are not reachable by nodes within the public internet 11 unless the owner of the NATS 18 have specifically enabled this, an action which requires networking expertise. For example nodes in a private enterprise network connected behind a NAT 18 typically have unique addresses which are unique within that enterprise network. However, these addresses are not unique within the internet. If a node behind a NAT or firewall 19 has a network address of one of the public nodes 16 it is able to use this to establish a connection with that public node. However the reverse is not necessarily the case. That is, a node 16 in the public internet is unable to form a connection with a node 19 behind a NAT without details of a network address of a port at the NAT at which a required binding has previously been set up. Because of this, private nodes 19 which are part of a peer-to-peer file sharing cloud can find it relatively difficult to obtain content as compared with public nodes. If the proportion of private nodes in the cloud is more than about 50% significant problems arise for peer-to-peer content distribution. In practice we have found that the proportion of private nodes in peer-to-peer content distribution clouds tens to be around 70%. In order to address this issue we therefore weight our network 'churn' algorithm in order to give bias towards dropping public rather than private connections.

In a preferred embodiment of the present invention we use an 'elastic' maximum number of connections which is set at a number of the order of tens but which can be increased in certain circumstances. For example, if more connections are required these can be established for a specified period of time. Similarly, we use an elastic minimum number of connections in some embodiments. For example, in some cases, a node currently housing the minimum number of connections is required to drop one of those as part of the network churn algorithm. The elastic minimum allows that node to remain in the cloud for a specified time despite having too few connections. In a preferred embodiment the elastic minimum is such that an existing peer is considered a member of the cloud until it reaches zero connections.

Figure 5:
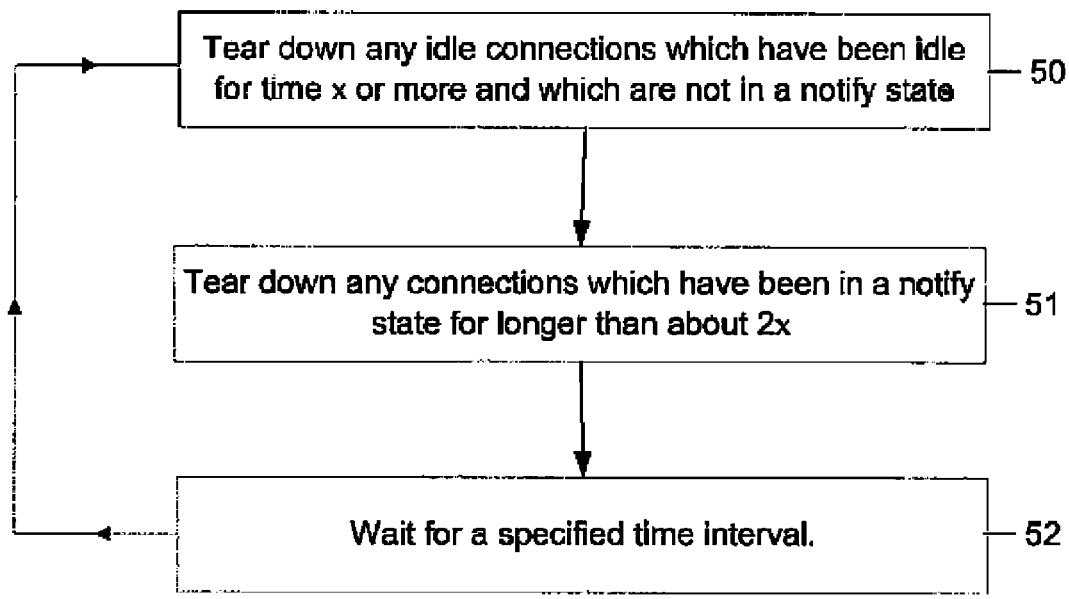
FIG. 5 is a flow diagram of a topology management process for "cleaning up" connections.

We have found that the following 'clean up' rules or topology management processes are particularly effective:
  arrange each peer node to carry out a 'clean up' every 60 seconds or after any other suitable time interval (see box 52 of FIG. 5)
  during that 'clean up' tear down any idle connections which have been idle for about 5 minutes or more and which are not in a notify state (see box 50 of FIG. 5); and/or
  during that 'clean up' tear down any connections which have been in a notify state for longer than about 10 minutes or for a time about twice as long as the maximum allowed idle time (see box 51 of FIG. 5). This clean up process is illustrated in FIG. 5.

Figure 6:
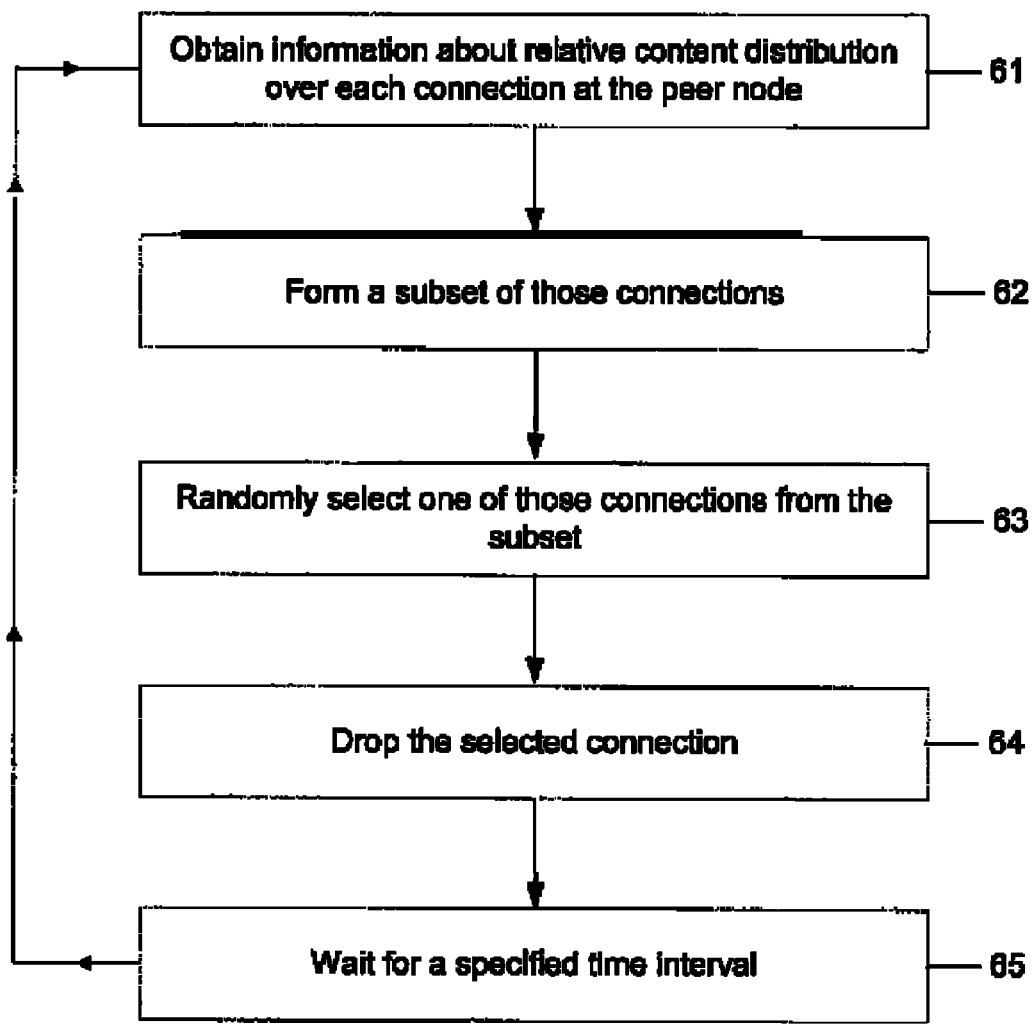
FIG. 6 is a flow diagram of a topology management process for facilitating "network churn".

We have found that the following 'network churn' rules or topology management processes are particularly effective:
  obtain information about relative content distribution over each connection at the peer node (see box 61 of FIG. 6)
  randomly select one of these connections (see box 62 of FIG. 6)
  drop the selected connection except where the relative content distribution over that connection is the poorest (see box 63 of FIG. 6)
  wait for a specified time interval and then repeat this method (see box 64 of FIG. 6).

In a preferred embodiment the information about relative content distribution comprises a rate of content distribution. The method can also comprise identifying a subset of connections at the peer node being all the connections excluding that having the poorest relative content distribution and that having the highest relative content distribution. The random selection is then made from this subset.

Peer Initialization

When a peer initializes, it must know the network endpoint of a tracker. To initialize for the first time in a cloud, it connects to the tracker and requests a description of the particular file the peer is interested in downloading or sharing. If the client already has this data from a pervious session, it checks with the tracker to confirm that the content should still be offered. After obtaining or confirming the file description, the peer is considered initialized.

As long as the peer is active and has at least one block of content to share, it registers itself with the tracker. It must periodically refresh this registration as it will automatically time out. The peer should also de-register with the tracker when it is leaving the cloud.

In addition to obtaining file information and registering with the tracker, a peer may periodically query the tracker to find other peers. This query consists of a request to the tracker, followed by the trackers transmission of 0 or more endpoints to the peer.

Each tracker transaction can be handled over a separately established and maintained connection. The connection lifetime will typically be a single transaction.

Disconnecting from the Cloud

When disconnecting from the cloud, a peer does the following:

Send a message to the tracker, deleting itself from the list of active participants in the cloud.

Send a request to close the connection to each neighbor, letting the neighbor know that the node is shutting down.

Flush each connection (to ensure the disconnect notification is remotely received) and then close the connection.

In some embodiments of the invention the peer-to-peer content distribution algorithm uses network coding although this is not essential. The principle behind network coding is to allow peers to encode packets as opposed to server coding where only the server or seed nodes encode packets. Using network coding, every time a peer node needs to upload a packet to another peer, the source peer generates and sends a linear combination of all the information available to it. After a peer receives enough linearly independent combinations of packets it can reconstruct the original information. Using network coding, peer nodes in the cloud are likely to have at least parts of blocks of content which are not present at other neighboring nodes. Parts of content are 'spread' through the cloud such that a newly established connection is likely to yield at least some useful content as opposed to distribution algorithms which do not use network coding. In the present invention there are some methods which are particularly advantageous when network coding is used. For example, the network churn algorithms can be arranged to drop connections even when the minimum number of connections will not then be realized. This is because it is relatively easy for a node to find a new useful connection as opposed to situations where no network coding is used. For example, BitTorrent® is an example of an algorithm which does not use network coding.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method of managing connections at a node in a peer-to-peer content distribution cloud, said method comprising:
   (i) monitoring traffic on connections at the node for a specified first time period;
   (ii) allocating as being in a notify state any idle connections at the node over which content has been requested from a neighbor but is not present at that neighbor;
   (iii) tearing down any connections at the node which have been idle for at least that specified first time period and which are not in the notify state; and
   (iv) once every specified interval, selecting one of the connections at the node in a substantially random manner from at least a subset of the connections at the node and tearing down that connection;
   wherein said monitoring traffic on connections at the node further comprises obtaining information about relative content distribution over those connections; and wherein said subset of the connections at the node excludes the connection where the monitored relative content distribution over that connection is the lowest.

2. A method as claimed in claim 1 which further comprises:
tearing down any connections at the node which have been in the notify state for at least a second specified time period which is different and longer than the first time period.

3. A method as claimed in claim 2 wherein said second time period is about twice as long as the first time period.

4. A method as claimed in claim 3 wherein said first time period is between about 3 and 7 minutes.

5. A method as claimed in claim 3 which further comprises:
specifying a minimum number of connections required by the node in order to be part of the peer-to-peer content distribution cloud, and
allowing the number of connections at the node to fall below the minimum in specified situations.

6. A method as claimed in claim 5 which further comprises:
specifying a maximum number of connections required by the node in order to be part of the peer-to-peer content distribution cloud, and
allowing the number of connections at the node to exceed the maximum in specified situations.

7. A method as claimed in claim 6 wherein said monitoring traffic on connections at the node further comprises obtaining information about relative content distribution over those connections.

8. A method as claimed in claim 1 wherein said subset of the connections at the node excludes the connection where the monitored relative content distribution over that connection is the highest.

9. A method as claimed in claim 8 wherein said subset further excludes the connection where the monitored relative content distribution over that connection is the second highest.

10. A node in a peer-to-peer content distribution cloud said node comprising:
   (i) a plurality of connections to other nodes in the cloud;
   (ii) a monitor arranged to monitor traffic on connections at the node for a specified first time period;
   (iii) an allocator arranged to allocate as being in a notify state any idle connections at the node over which content has been requested from a neighbor but is not present at that neighbor;
   (iv) a processor arranged to tear down connections at the node which have been idle for at least that specified first time period and which are not in the notify state; and
   (v) a processor further arranged to, once every specified interval, select one of the connections at the node in a substantially random manner from at least a subset of connections at the node, and tear down that connection, wherein the monitor arranged to monitor traffic on connections at the node obtains information about relative content distribution over those connections; and wherein said subset of the connections at the node excludes the connection where the monitored relative content distribution over the connection is the lowest.

11. A node as claimed in claim 10 wherein the processor is further arranged to tear down any connections at the node which have been in the notify state for at least a second specified time period which is different and longer than the first time period.

12. One or more storage devices with computer-executable instructions for performing acts at a node connected in a peer-to-peer content distribution cloud said acts comprising:
   monitoring traffic on connections at the node for a specified first time period;
   allocating as being in a notify state any idle connections at the node over which content has been requested from a neighbor but is not present at that neighbor;
   tearing down any connections at the node which have been idle for at least that specified first time period and which are not in the notify state; and
   once every specified interval, selecting one of the connections at the node in a substantially random manner from at least a subset of connections at the node, and tearing down that connection wherein said monitoring traffic on connections at the node further comprises obtaining information about relative content distribution over those connections; and wherein said subset of the connections at the node excludes the connection where the monitored relative content distribution over the connection is the lowest.

13. One or more storage devices as claimed in claim 12 wherein said acts further comprise tearing down any connections at the node which have been in the notify state for at least a second specified time period which is different and longer than the first time period.

* * * * *